United States Patent Office 3,399,212
Patented Aug. 27, 1968

3,399,212
BENZIMIDAZOLE UREAS
John R. E. Hoover, Glenside, and Robert John Stedman, Paoli, Pa., assignors to Smith Kline & French Laboratories, Philadelphia, Pa., a corporation of Pennsylvania
No Drawing. Filed Sept. 12, 1966, Ser. No. 578,512
Claims priority, application Australia, May 16, 1966, 5,600/66
15 Claims. (Cl. 260—309.2)

ABSTRACT OF THE DISCLOSURE 1-(2-benzimidazolyl)-3-alkyl, alkanyl, or cycloalkyl-ureas are prepared by reaction of a 2-aminobenzimidazole with the appropriate isocyanate. 3,3-bisubstituted compounds are prepared by reaction of the appropriate secondary amine with a 2-benzimidazolyl thiolcarbamate ester. The compounds are anthelmintics.

---

This invention relates to substituted benzimidazoleurea compounds having anthelmintic activity. In particular, the invention relates to 1-(2-benzimidazolyl)-3-mono or disubstituted ureas, in which the 3-substituents are hydrogen, lower alkyl, lower alkenyl, or lower cycloalkyl.

Unsubstituted 2-benzimidazolylurea has been described in the older chemical literature by Pellizari et al. [Gazz. Chim. Ital. 48, II, 151 (1918), 51, I, 89 (1921)] and Ridi et al. [Ann. Chim. (Rome) 44, 769 (1954)], as has a phenyl benzimidazolylurea [Gazz. Chim. Ital. 51, I, 89 (1921)]. None of these workers disclosed any anti-infective activity for these compounds. The present invention consists of 2-benzimidazolylureas, substituted at the 3-nitrogen atom with an alkyl, alkenyl, or cycloalkyl group, and optionally substituted on the benzene ring. These compounds are anthelmintic agents.

The product compounds of the invention are represented by the following structural formula:

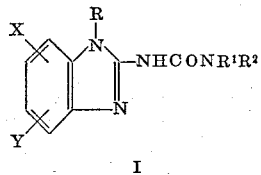

I wherein:

X and Y are hydrogen, alkyl, alkoxy, chloro, bromo, trifluoromethyl, or nitro;
R is hydrogen, lower alkyl, or benzyl;
$R^1$ is hydrogen or lower alkyl; and
$R^2$ is lower alkyl, lower alkenyl, or lower cycloalkyl.

A preferred group of compounds is represented by Formula I where X and Y are hydrogen, lower alkyl of 1–4 carbon atoms, lower alkoxy of 1–4 carbon atoms, chloro, bromo, trifluoromethyl, or nitro; R is hydrogen; $R^1$ is hydrogen or lower alkyl of 1–3 carbon atoms; and $R^2$ is lower alkyl of 1–3 carbon atoms, allyl, or cycloalkyl of 3–6 carbon atoms.

A class of intermediate compounds useful for preparing certain of the product compounds of Formula I is also part of the invention. These compounds are represented by Formula II, where X, Y, and $R^2$ are as defined in Formula I.

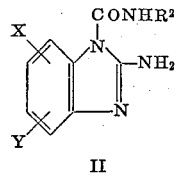

II

The invention also includes methods of eliminating helminths from mammals by administering to said mammals any of the anthelmintic copounds of the invention.

The compounds of Formula I in which $R^1$ is hydrogen are prepared by treating a 2-aminobenzimidazole with an alkyl, alkenyl, or cycloalkyl isocyanate in a solvent. Pyridine is conveniently used, although other solvents such as acetone and tetrahydrofuran are usable. The reaction is heated on the steam bath, and the product is most advantageously isolated by adding water and filtering off the precipitated product. Purification is accomplished by dissolving the compound in aqueous alcoholic alkali and precipitating by acidification to pH ca. 7.5 with acetic acid. Further purification may be accomplished by recrystallization from dimethyl sulfoxide and water or from methanol and water.

When the above reaction is conducted at a lower temperature, preferably at 0–15°, and when the starting benzimidazole is unsubstituted at the ring nitrogen (R=H), an intermediate compound of Formula II is formed, reaction having occurred at the ring nitrogen, rather than at the exocyclic nitrogen. This compound is isolated by precipitation with water and removal by filtration. This intermediate is converted to the final product of Formula I by heating on the steam bath in a solvent such as pyridine.

Compounds in which $R^1$ is not hydrogen are not prepared by the above method, but are prepared by treating ethyl 2-benzimidazolyl thiolcarbamate with an amine of the formula $R^1R^2NH$, where $R^1$ is not hydrogen, but along with $R^2$ may be lower alkyl, lower alkenyl, or lower cycloalkyl. Compounds where $R^1$ is hydrogen may also be prepared by this latter method.

Compounds where X, Y, and R are other than hydrogen are prepared by starting with the appropriately substituted known 2-aminobenzimidazoles. The various isocyanates and amines used as starting materials are either readily available or are prepared by known methods. The cycloalkyl isocyanates are prepared from the known carboxylic acids by means of the Curtius rearrangement.

In addition to the basic compounds of Formula I, the invention includes the pharmaceutically acceptable acid addition salts thereof, particularly the hydrochloride, hydrobromide, sulfate, hexamate, citrate, acetate, and maleate. The salts are prepared in the conventional manner, i.e., by addition of the acid either as such or in the form of a solution to a solution of the basic compound.

The compounds of Formula I are active against worm infestations, particularly those of Syphacia obvelata. They have been shown to cause a 56–100% reduction in the number of worms present in mice, when administered orally in doses of 10–250 mg./kg. The preferred compounds are 1-(2-benzimidazolyl)-3-methyl-urea, 1-(2-benzimidazolyl - 3 ethylurea, 1 - (2 - benzimidazolyl)-3-propylurea, 1 - (2 - benzimidazolyl)-3-isopropylurea, 1-

(2 - benzimidazolyl) - 3,3-dimethylurea, 1-(2-benzimidazolyl)-3-cyclopropylurea, and 1-[5(6)-butyl-2-benzimidazolyl]-3-methylurea. They are also active against Haemonchus, Trichostrongylus spp., Ostertagia, Strongyloides, Cooperia, Nematodirus, Oesophagostomum, Chabertia, Trichuris, and Bunostomum. In addition, they are active against sheep helminths.

The compounds are used for treatment of worm infestations in farm animals by administration as a sheep drench or bolus for cattle. Typical drench formulations may include, in addition to the active anthelmintic compound, terra, alba, tragacanth, sodium lauryl sulfate, methyl cellulose, polyethylene glycol, silicone antifoam, and water. A cattle bolus may include calcium phosphate, maize starch, talcum, gum arabic, and magnesium stearate.

The following examples are intended to illustrate the preparation of the compounds of the invention, but are not to be construed as limiting the scope thereof.

Example 1.—1-(2-benzimidazolyl)-3-methylurea

To a cooled solution of 26.6 g. (0.2 mole) of 2-aminobenzimidazole in 160 ml. of dry pyridine is added dropwise 11.4 g. (0.2 mole) of methyl isocyanate. Stirring is continued in ice for 10 minutes, at room temperature for 30 minutes, and on the steam bath for about 1 hour, during which latter period the reaction mixture solidifies. Water (160 ml.) is added, the precipitate collected by filtration, and the filtered material washed with cold water and dried. The compound is suspended in a solution of 400 ml. of 95% alcohol and 250 ml. of water. Sodium hydroxide solution (10%, 250 ml.) is added, the solution is stirred for 2–3 minutes, and the solution is filtered. The pH is adjusted to ca. 7.5 with acetic acid and the resulting precipitate is filtered off and washed with a 60:40 mixture of ethanol and water. The compound is recrystallized by dissolving it in 500 ml. of dimethyl sulfoxide at 90°, filtering, adding 5 ml. of water, heating to clearness, and allowing the solution to stand. The resulting crystals are collected and washed with dimethyl sulfoxide, and the traces of the solvent are removed by twice suspending the sample in water, boiling for 2 minutes, and filtering the product. The title product obtained does not melt below 300°.

To a suspension of the basic product in acetonitrile containing 10–20% water is added ethereal hydrogen chloride. The mixture is warmed to effect solution, and cooled to obtain the hydrochloride salt as a crystalline solid. Recrystallization gives the pure salt.

Example 2.—1-(2-benzimidazolyl)-3-ethylurea

To a cooled solution of 26.6 g. (0.2 mole) of 2-aminobenzimidazole in 160 ml. of dry pyridine is added 14.24 g. (0.2 mole) of ethyl isocyanate. The mixture is stirred for 10 minutes in ice, for 30 minutes at room temperature, during which time the intermediate 1-(N-ethylcarbamoyl) compound precipitates out, and for 1 hour on the steam bath, during which time the precipitate redissolves, then the mixture solidifies. The mixture is allowed to cool 160 ml. of water is added, and the precipitate is filtered off, washed with water, and dried. The compound is suspended in 550 ml. of 55:45 ethanol-water, 200 ml. of 10% sodium hydroxide is added, the solution is filtered, and the pH is adjusted to ca. 7.5 with acetic acid. The resulting white solid is collected, washed with 50% aqueous alcohol, and dried. The compound is recrystallized by dissolving in 250 ml. of dimethyl sulfoxide at 95°, filtering, and allowing the filtrate to cool. The resulting crystals are collected and washed with dimethyl sulfoxide. The solvent traces are removed by twice suspending the compound in 250 ml. water, boiling for 2 minutes, and collecting the solid. The title product obtained does not melt below 300°.

Example 3.—1-(2-benzimidazolyl)-3-propylurea

To a solution of 26.6 g. (0.2 mole) of 2-aminobenzimidazole in 160 ml. of dry pyridine is added 17.0 g. (0.2 mole) of propyl isocyanate as in Examples 1 and 2. The reaction is conducted and the mixture worked up exactly as described in the previous examples to give the title product, which does not melt below 300°.

Example 4.—1-(2-benzimidazolyl)-3-isopropylurea

To a solution of 26.6 g. (0.2 mole) of 2-aminobenzimidazole in 160 ml. of dry pyridine is added 17.0 g. (0.2 mole) of isopropyl isocyanate as in Examples 1 and 2. The reaction is conducted and the mixture worked up as described in Examples 1 and 2. The product is recrystallized by dissolving it in ca. 3 liters of hot methanol, filtering, and adding ca. 600 ml. of water. Upon being cooled, the product separates out. The title product does not melt below 300°.

Example 5

When the following 2-aminobenzimidazoles in pyridine are treated with equimolar amounts of the listed isocyanates according to the procedures of Examples 1 and 2, the corresponding products are obtained.

Benzimidazole:
    2-amino-5(6)-decylbenzimidazole
    2-aminobenzimidazole
    2-amino-1-ethylbenzimidazole
    2-amino-1-benzylbenzimidazole
    2-amino-1-methyl-7-methoxybenzimidazole
    2-amino-5(6)-nitrobenzimidazole
    2-amino-4(7)-chlorobenzimidazole
    2-amino-5(6)-methylbenzimidazole
    2-amino-4(7)-trifluoromethylbenzimidazole
    2-amino-5,6-dimethylbenzimidazole
    2-amino-5(6)-butylbenzimidazole
    2-amino-5,6-dimethoxybenzimidazole Isocyanate:
    methyl isocyanate
    allyl isocyanate
    cyclopropyl isocyanate
    methyl isocyanate
    ethyl isocyanate
    propyl isocyanate
    isopropyl isocyanate
    propyl isocyanate
    cyclopropyl isocyanate
    methyl isocyanate
    ethyl isocyanate
    cyclopentyl isocyanate Product:
    1-[5(6)-decyl-2-benzimidazolyl]-3-methylurea
    1-(2-benzimidazolyl)-3-allylurea
    1-(2-benzimidazolyl)-3-cyclopropylurea
    1-(1-ethyl-2-benzimidazolyl)-3-methylurea
    1-(1-benzyl-2-benzimidazolyl)-3-ethylurea
    1-(1-methyl-7-methoxy-2-benzimidazolyl)-3-propylurea
    1-[5(6)-nitro-2-benzimidazolyl]-3-isopropylurea
    1-[4(7)-chloro-2-benzimidazolyl]-3-propylurea
    1-[5(6)-methyl-2-benzimidazolyl]-3-cyclopropylurea
    1-[4(7)-trifluoromethyl-2-benzimidazolyl]-3-methylurea
    1-(5,6-dimethyl-2-benzimidazolyl)-3-ethylurea
    1-[5(6)-butyl-2-benzimidazolyl]-3-ethylurea
    1-(5,6-dimethoxy-2-benzimidazolyl)-3-cyclopentylurea Example 6.—1-(2-benzimidazolyl)-3,3-dimethylurea Ethyl 2-benzimidazolyl thiolcarbamate (3.0 g., 0.0135 mole) (Belgian Patent 666,795) is dissolved in a minimum amount of dimethyl formamide. To the stirred solution at room temperature is added in one portion 10.68 ml. (0.0405 mole) of dimethylamine (as a 25% solution in water) and the resulting solution is stirred at room temperature for three hours. The mixture is cooled in ice and the solid is collected, washed with water, and dried; M.P. 250–252° dec. The compound is recrystallized by dissolving in boiling 95% alcohol and allowing to cool.

*Analysis.*—Calc'd for $C_{10}H_{12}N_4O$: C, 58.81; H, 5.92; N, 27.43. Found: C, 58.79; H, 5.85; N, 27.44.

In like manner, use of a corresponding amount of diethylamine, methylethylamine, methylcyclopropylamine, and diallylamine instead of dimethylamine, results in the formation of the 3,3-diethyl, 3-methyl-3-ethyl, 3-methyl-3-cyclopropyl, and 3,3-diallyl ureas, respectively.

Compounds with benzene-ring substituents, e.g. 5(6)-butyl, are prepared in a similar manner, starting with a properly ring-substituted thiolcarbamate ester.

Example 7.—2-amino-1-(N-methylcarbamoyl) benzimidazole

To a stirred and cooled mixture of 10 g. (0.075 mole) of 2-aminobenzimidazole and 75 ml. of dry pyridine is added 4.27 g. (0.075 mole) of methyl isocyanate at such a rate that the reaction temperature is maintained at 8–12°. After the addition of the isocyanate is completed, the mixture is stired with cooling for an additional 10 minutes. Water (75 ml.) is then added with stirring, and the precipitated solid is filtered off and washed with water. The title compound (6.6 g.) is purified by dissolving in 45 ml. of alcohol (95%), filtering, and adding 45 ml. of water.

Example 8.—1-(2-benzimidazolyl)-3-methylurea 2-amino-1-(N - methylcarbamoyl)benzimidazole (500 mg.) is dissolved in 3 ml. of dry pyridine and the solution heated under anhydrous conditions on the steam bath for 1 hour, during which time the mixture solidifies. Water (3 ml.) is added, the mixture is cooled, and the precipitate of the title product is filtered and washed with water; M.P. 324° dec.

Example 9.—1[5(6)-butyl-2-benzimidazoyl]-3-methylurea

A solution of 11 g. (0.0581 mole) of 5(6)-butyl-2-aminobenzimidazole in 66 ml. of dry pyridine is stirred with cooling in ice and 3.31 g. (0.0581 mole) of methyl isocyanate is added at a moderately fast rate by dropper. The mixture is stirred in an ice bath for 10 minutes, at room temperature for 30 minutes, and then on the steam bath for 1.5 hours. Water (ca. 200 ml.) is added to the solid mass and the solid is collected by filtration, washed with water, and dried; M.P. 228–230°. The sample is suspended in 600 ml. of 50% aqueous ethanol, 75 ml. of 3 N HCl is added to dissolve most of the solid, the mixture is filtered, and the filtrate is neutralized to ca. pH 7.5 with 10% NaOH to precipitate the title product, which is filtered off and washed with 50% ethanol. Two recrystallizations from 2:1 ethanol-water give the pure product, M.P. 231–232°.

Example 10.—1-(2-benzimidazolyl)3-cyclopropylurea

Cyclopropylamine (3.88 g., 0.068 mole) is added to a suspension of 7.5 g. (0.034 mole) of ethyl 2-benzimidazolyl thiolcarbamate in 40 ml. of dry dimethylforamide. The mixture is heated on the steam bath under anhydrous conditions. The solid quickly dissolves and then reprecipitates. Dimethylformamide (10 ml.) is added, the mixture is again heated on the steam bath for 45 minutes, and then cooled, and the resulting solid filtered off and washed with water; M.P. >330°. The product is recrystallized twice by dissolving in hot dimethyl sulfoxide and adding ethanol. The last traces of dimethyl sulfoxide are removed by suspending the product in water, boiling for ca. 5 minutes, and filtering. The product does not melt below 330°.

We claim:
1. A compound of the following formula:

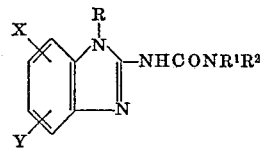

wherein:
X and Y are hydrogen, alkyl of 1–14 carbon atoms, alkoxy of 1–4 carbon atoms, chloro, bromo, trifluoromethyl, or nitro;
R is hydrogen, lower alkyl 1–3 carbon atoms, or benzyl;
$R^1$ is hydrogen or lower alkyl of 1–3 carbon atoms; and
$R^2$ is lower alkyl of 1–3 carbon atoms, allyl, or cycloalkyl of 3 to 6 carbon atoms;
or a pharmaceutically acceptable acid addition salt thereof.

2. A compound as claim in claim 1, where R, X, and Y are hydrogen.

3. A compound as claimed in claim 2, where $R^1$ is hydrogen.

4. A compound as claimed in claim 3, in which $R^2$ is methyl, being the compound 1-(2-benzimidazolyl)-3-methylurea.

5. A compound as claimed in claim 3 in which $R^2$ is propyl, being the compound 1-(2-benzimidazolyl)-3-propylurea.

6. A compound as claimed in claim 3, in which $R^2$ is cyclopropyl, being the compound 1-(2-benzimidazolyl)-3-cyclopropylurea.

7. A compound as claimed in claim 3, in which $R^2$ is allyl, being the compound 1-(2-benzimidazolyl)-3-allylurea.

8. A compound as claimed in claim 3, in which $R^2$ is ethyl, being the compound 1-(2-benzimidazolyl)-3-ethylurea.

9. A compound as claimed in claim 3, in which $R^2$ is isopropyl, being the compound 1-(2-benzimidazolyl)-3-isopropylurea.

10. A compound as claimed in claim 2, where $R^1$ and $R^2$ are methyl, being the compound 1-(2-benzimidazolyl)-3,3-dimethylurea.

11. A compound as claimed in claim 1, where R and Y are hydrogen and X is butyl.

12. A compound as claimed in claim 11, where $R^1$ is hydrogen and $R^2$ is methyl, being the compound 1-[5(6)-butyl-2-benzimidazolyl]-3-methylurea.

13. A compound as claimed in claim 1, where $R^2$ is allyl or cycloalkyl of 3 to 6 carbon atoms.

14. A compound of the formula

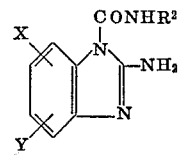

wherein:
$R^2$ is lower alkyl of 1–3 carbon atoms, allyl, or cycloalkyl of 3 to 6 carbon atoms; and
X and Y are hydrogen, lower alkyl of 1–4 carbon atoms, lower alkoxy of 1–4 carbon atoms, chloro, bromo, trifluoromethyl, or nitro;
with the proviso that when X and Y are both hydrogen, $R^2$ is not methyl.

15. A compound as claimed in claim 14, where X and Y are hydrogen and $R^2$ is lower alkyl of 1–3 carbon atoms or cyclopropyl.

(References on following page)

References Cited

UNITED STATES PATENTS 3,336,191   8/1957   Craig et al. _____ 260—309.2

OTHER REFERENCES

Pellizzari: Gaz. Chim. Ital. vol. 48, II, pp. 155 and 162–72 relied on, (1918).

Pellizzari: Gaz. Chim. Ital., vol. 49, I, pp. 16–26 (1919).

Pellizzari: Gaz. Chim. Ital., vol. 51, I, pp. 92–5, 99, 100, and 104 (1921).

NORMA S. MILESTONE, *Primary Examiner.*

NATALIE TROUSOF, *Assistant Examiner.*